Inventor
Will C. State.

Sept. 6, 1932.    W. C. STATE    1,876,087
APPARATUS FOR MANUFACTURING TUBULAR ARTICLES
Filed Dec. 27, 1928    3 Sheets-Sheet 3

Inventor
Will C. State.
Attorney

Patented Sept. 6, 1932

1,876,087

UNITED STATES PATENT OFFICE

WILL C. STATE, OF AKRON, OHIO, ASSIGNOR TO THE GOODYEAR TIRE & RUBBER COMPANY, OF AKRON, OHIO, A CORPORATION OF OHIO

APPARATUS FOR MANUFACTURING TUBULAR ARTICLES

Application filed December 27, 1928. Serial No. 328,678.

The invention relates to apparatus for manufacturing tubular articles and it has particular relation to apparatus of the above designated character for manufacturing inner tubes for pneumatic tire casings.

An object of the invention is to provide an apparatus for manufacturing tubular articles adapted to be cured or vulcanized in molds without employing mandrels therein.

Another object of the invention is to provide a flexible form on which tubular articles are adapted to be constructed.

The apparatus embodies a calender in which a laminated strip of plastic rubber material is formed. The strip is received from the calender upon a plurality of cooling rollers and suspended in a loop between the latter and an intermittently rotating conveyor. The conveyor discharges the strip successively upon a plurality of flexible forms which are positioned radially upon a rotatable frame or table. The forms and the aforesaid conveyor are rotated simultaneously during each period the strip is wound spirally upon one of the forms. When a predetermined length of such strip is so wound upon one of the forms, it is severed between the latter and the conveyor and the frame is rotated until another of the flexible forms is positioned adjacent the conveyor. While a second strip is being wound upon a form, a valve stem and patch is applied to the first and it is impregnated with soapstone or other suitable antifriction material at an adjacent station. When the winding of the second strip is completed, the frame is again rotated and the aforesaid operations are repeated while a folding apparatus is employed in overlapping the opposite edges of the first mentioned strip to form a circumferential seam. After the frame is moved again and during the time when all of the aforesaid operations are being repeated, the first mentioned form is collapsed and a completely formed inner tube is removed therefrom. The inner tube then is inflated in an annular mold and vulcanized in any suitable manner.

For a better understanding of the invention, reference may now be had to the accompanying drawings, forming a part of the specification, in which:

Fig. 4 is a fragmentary view illustrating one of the forms in its collapsed position.

Figure 1:
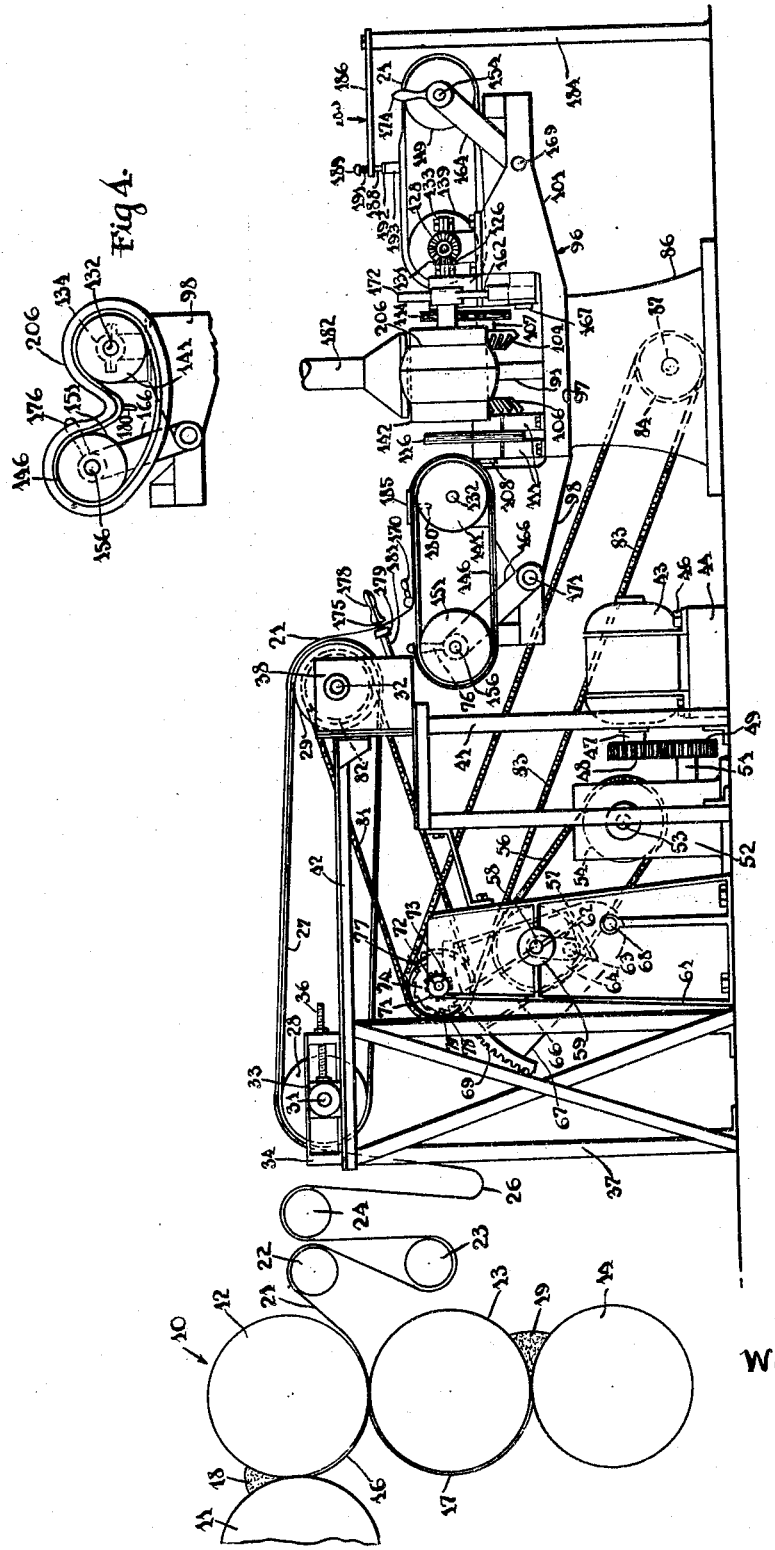
Fig. 1 is a side elevational view of the apparatus.

Referring more particularly to Fig. 1, a calender 10 employed in practicing the invention comprises a plurality of rollers 11, 12, 13 and 14. Auxiliary strips 16 and 17 are formed in the calender 10 from batches 18 and 19 of plastic rubber composition or other suitable material inserted between pairs 11 and 12, and 13 and 14 of the rollers respectively. The strips 16 and 17 are pressed together by the rollers 12 and 13 to form a laminated strip 21, which is festooned upon rollers 22, 23 and 24 containing water or other suitable cooling fluid. The rolls of the calender 10 and likewise the cooling fluid rollers 22, 23 and 24 are driven continuously at a uniform rate. The strip 21 is suspended in a loop 26 between the cooling roller 24 and an endless conveyor 27, which is supported at opposite ends by rollers 28 and 29 rotatably mounted upon shafts 31 and 32. The shaft 31 is journaled adjacent its opposite ends in blocks 33, which are slidably mounted in guide frames 34 in which the blocks are adjustably positioned by threaded rods 36. The guide frames 34 are rigidly secured upon the upper surface of a frame 37. The shaft 32 supporting the roller 29 is journaled adjacent its opposite ends in plates 38 which are supported by a frame 41 and are connected to the frame 37 by bars 42.

A motor 43, which is secured rigidly upon a base 44 by bolts 46, is provided with a shaft 47 and a drive pinion 48 engaging a gear 49, which is secured rigidly upon a shaft 51 projecting from a worm reduction gear box 52. A driven shaft 53, likewise projecting from the gear box 52, is provided with a sprocket wheel 54 operatively engaging a chain 56 which, in turn, drives a sprocket wheel 57 secured rigidly upon one end of a crank shaft 58. Bearings 59, formed in a spaced pair of vertically disposed frames 61, rotatably support the opposite ends of the crank shaft 58. The throw portion 62 of the crank shaft 58 is provided with a crank pin 63 which is journaled in a block 64 having its edges slidably disposed in radially disposed guide portions 66 formed in a large gear segment 67. A pin 68, rigidly secured in one of the frames 61, rotatably supports the segment 67 at its axis.

When the chain 56 is rotatably driven by the motor 43, thus rotating the crank 58, the segment 67 is oscillated upon the pin 68 by the rotation of the pin 63 in the slidably disposed block 64. Gear teeth 69, disposed on the outer portion of the segment 67, operatively engage a pinion 71 which is rigidly secured adjacent one end of a shaft 72.

Bearings 73, formed in the upper portions of the frame 61, rotatably support the opposite ends of the shaft 72. A disc 74, having ratchet teeth 76 formed on the periphery thereof and comprising the internal element of a disc and roller clutch 77 is rigidly secured intermediate the ends of the shaft 72. Rollers 78, positioned between the teeth 76 of the disc 74, are adapted to be urged against the inner periphery of a ring 79 comprising the external element of the clutch 77. The ring 79 is rotatably mounted upon the shaft 72 in the usual manner upon a bearing, not shown, connected to the ring by an integrally formed web. When the disc 74 is rotated in a clockwise direction by the shaft 72, the roller 78 will be clamped against the ring 79, thus rotating the aforesaid external element of the clutch. During rotation of the disc in the opposite direction, the rollers 78 will be carried in the depression between the ratchet teeth 76, thus permitting the ring portion 79 to remain stationary. The outer surface of the ring 79 is provided with teeth for driving a sprocket chain 81 which, in turn, drives a sprocket wheel 82, which is rigidly secured adjacent one end of the shaft 32. Thus, when the ring 79 is driven in a clockwise direction, the conveyor 27 will be driven in the same direction. By varying the distance between the center of the pin 63 and the center of the crank shaft 58, the belt 27 may be driven variable distances. The ring 79 also is provided with other gear teeth for driving a chain 83, from which a sprocket wheel 84 is likewise rotatably driven. The sprocket wheel 84 is rigidly secured at one side of a pedestal 86 upon a stud shaft 87 rotatably mounted in the pedestal and projecting into a chamber formed therein.

A bevel gear 88, rotatably mounted on the opposite end of the shaft 87, operatively engages a bevel gear 89 rigidly secured intermediate the ends of a vertically disposed shaft 91. The lower end of the shaft 91 is rotatably received in a thrust bearing 92 while a portion thereof above the bevel gear 89 is journaled in a bearing 93 formed in an upper web portion 94 of the pedestal 86. A frame 96, comprising a base portion 97 and four outwardly projecting brackets 98, 99, 101 and 102, is rotatably supported upon the upper surface of the pedestal 86. The shaft 91 projects through the base 97 and provides an axis upon which the frame 96 is adapted to rotate, although the shaft is received in the base rotatably.

Rigidly secured on the upper end of the shaft 91 is a disc 95 having a plurality of ratchet teeth 100 formed on its periphery which are adapted to receive a plurality of rollers 105 therebetween. When the disc 95 is rotated in a clockwise direction (see Fig. 2), the rollers 105 are thrust outwardly by the teeth 100 against the inner periphery of a beveled ring gear 103, which is adapted to be rotatably mounted upon the shaft 91 below the disc 95. The disc 95, the rollers 105, the ring gear 103, and cover plate 85 secured to the disc 95 comprise the elements of a disc and roller clutch 110, which is provided for the purpose of permitting the rotation of the ring gear independently of the shaft 91.

The bevel ring gear 103 meshes with a pair of bevel gears 104 and 106 rigidly secured upon the inner ends of a pair of stud shafts 107 and 108. Spaced pairs of bearings 109 and 111, rotatably support the stud shafts 107 and 108 respectively adjacent the gears 104 and 106. Sprocket wheels 112 and 113, secured on the stud shafts 107 and 108 respectively between the spaced pairs of bearings are adapted to drive sprocket chains 114 and 116, which in turn drive sprocket wheels 117 and 118, rigidly secured intermediate the ends of the shafts 119 and 121. Journal bearings 122 and 123, bolted to the frames 102 and 99 respectively, as indicated at 124, rotatably support the shafts 119 and 121 respectively. Bevel gears 126 and 127, rigidly secured on opposite ends of the shafts 119 and 121 mesh respectively with bevel gears 128 and 129, which in turn are secured rigidly on the ends of shafts 131 and 132. The latter shafts are likewise rotatably supported by bearings 133 and 134, which are secured by bolts, indicated at 136 respectively, on brackets 101 and 98, projecting outwardly from the base plate 97.

Spaced pairs of rollers 137, 138, 139 and 141 are rigidly secured on the shafts 119, 121, 131 and 132 beyond the bearings 122, 123, 133 and 134 respectively. Flexible belts or forms 142, 143, 144 and 146, are adapted, at one end to be rotatably supported by the aforesaid spaced pairs of rollers while the opposite ends thereof likewise are rotatably supported by similarly spaced pairs of rollers 147, 148, 149 and 151 respectively. The last mentioned spaced pairs of rollers are rotatably secured upon stud shafts 152, 153, 154 and 156, which are secured respectively in bosses 157, 158, 159 and 161 formed at the upper ends of a plurality of rock arms 162, 163, 164 and 166. The lower ends of the rock arms 162, 163, 164 and 166 are rotatably supported by pins 167, 168, 169 and 171, which are rigidly secured in the frame brackets 102, 99, 101 and 98 respectively. The position of the pins 167, 168, 169 and 171, relative to the shafts 152, 153, 154 and 156 is such that the arms 162, 163, 164 and 166 are inclined at their upper ends away from the shafts 119, 121, 131 and 132 respectively.

The bosses 157, 158, 159 and 161 are provided with operating levers 172, 173, 174 and 176 projecting upwardly therefrom for the purpose of rocking the arms 162, 163, 164 and 166 manually upon the pins 167, 168, 169 and 171. The pedestal 86 is so positioned relative to the conveyor 27 that the axis of the shaft 91 lies in the median plane of rotation of the conveyor. The distance between the axis of the shaft 91 and the discharge end of the conveyor 27 is such that the strip of plastic material 21 transported thereby will be disposed directly upon one of the forms 142, 143, 144 and 146 in a central position thereon. The aforesaid forms are rotated by the mechanical apparatus hereinbefore described at the same peripheral speed as the conveyor 27 and for the same period of time. Consequently, assuming the form 146 to be positioned directly at the end of the conveyor 27, the strip of plastic material 21 will be wound spirally upon the form 146 during an intermittent period of operation of the apparatus. At the end of this period the strip is severed between the conveyor and the form 146 by a manually operating cutting tool 178, which is adapted to be drawn across the strip against the outer surface of a bar 179, having its opposite ends supported upon a spaced pair of brackets 181 secured to the plates 38.

The cutting disc 175 of the cutting tool 178 is provided with a plurality of notches around its sharpened edge which permit portions of the strip along the bar 179 to remain unsevered and consequently, to retain the ends of the strip together after the operation of the tool. A manually operable stitching roller 170 then is employed upon the upper surface of the form 146 to pull the unsevered portions of the strip apart and simultaneously to stitch the remaining upwardly projecting end thereof down upon the portion supported by the form. A valve stem 180, supported by a valve patch 185, then is thrust through one of a plurality of spaced openings 190 formed along the median plane of all of the forms 142, 143, 144 and 146 directly opposite the space between all of the rollers by which they are supported. Then while the segment 67 is traveling in the opposite direction and the disc 74 is rotating idly within the ring 79, the frame 96 is rotated manually on the pedestal until the form 142 is positioned adjacent the end of the conveyor 27.

During the next simultaneous operation of the conveyor 27 and the forms 142, 143, 144 and 146, a succeeding portion of the strip 21 is wound spirally upon the form 142 while the strip supported by the form 146 is impregnated by soapstone or other antifriction material discharged from the soapstone applying mechanism 182, which is suspended from above in permanent relation to the form located at this station. At the termination of this period of operation of the apparatus, the strip 21 again is severed by the tool 178 and the frame is rotated manually as hereinbefore described until the form 144 occupies the region adjacent the end of the conveyor 21; the form 142 is positioned beneath the soapstone applying device 182; and the form 146 is moved into a position diametrically opposite the conveyor 21, in the vicinity of a folding apparatus 183. This apparatus is supported by a permanently located vertically disposed bar 184, the upper end of which supports a bar 186 projecting along the middle plane of the form 146 to a point approximately midway between the spaced pairs of rollers 141 and 151, by which the form is supported.

Figure 5:
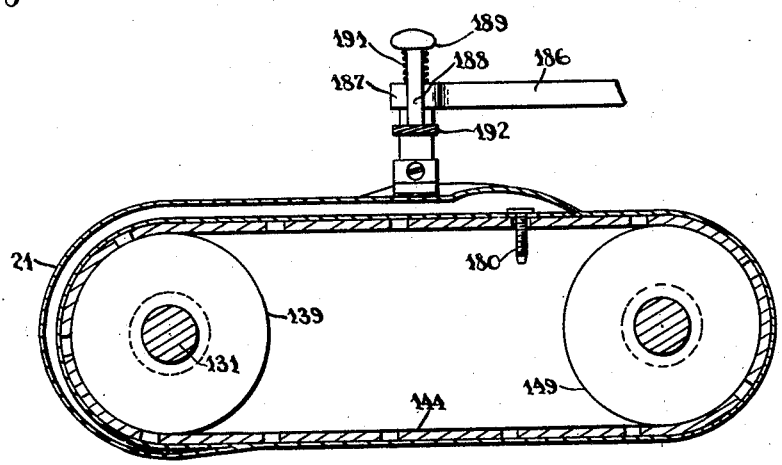
Fig. 5 is a cross-sectional view taken substantially on line V—V of Fig. 2.
Figure 6:
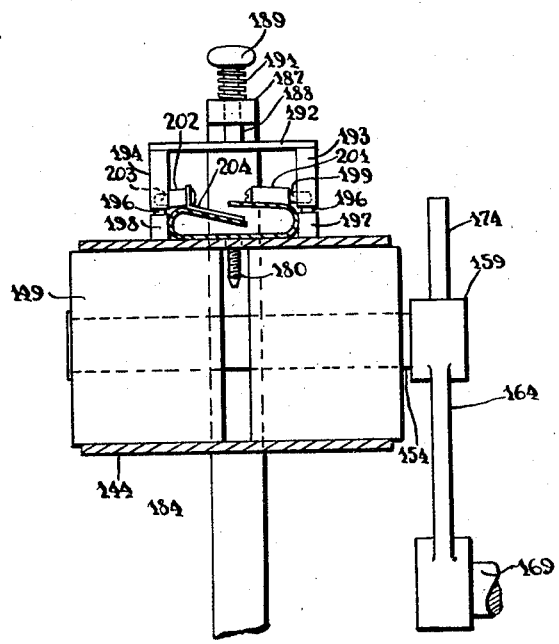
Fig. 6 is a cross-sectional view taken substantially along the line VI—VI of Fig. 2.

As best shown by Figs. 5, and 6, the end of the bar 186 is provided with a boss 187 in which a vertically disposed pin 188 is slidably received. The upper end of the pin 188 is provided with an enlarged knob 189, by which it is adapted to be operated manually. A spring 191 is confined between the knob 189 and the boss 187. Below the boss 187, the lower end of the pin is rigidly secured substantially intermediate the ends of a bar 192 disposed transversely to the form. Projecting downwardly from opposite ends of the bar 192 is a pair of blocks 193 and 194, the lower ends of which are provided with reduced journaled portions 196 for rotatably supporting a pair of rollers 197 and 198. A pin 199, rigidly secured at one end adjacent the lower end of the block 193 and projecting toward the block 194 in substantially parallel relation to the form, is adapted rotatably to receive a roller 201, the outer end of which terminates immediately adjacent the median plane of the form.

Figure 2:
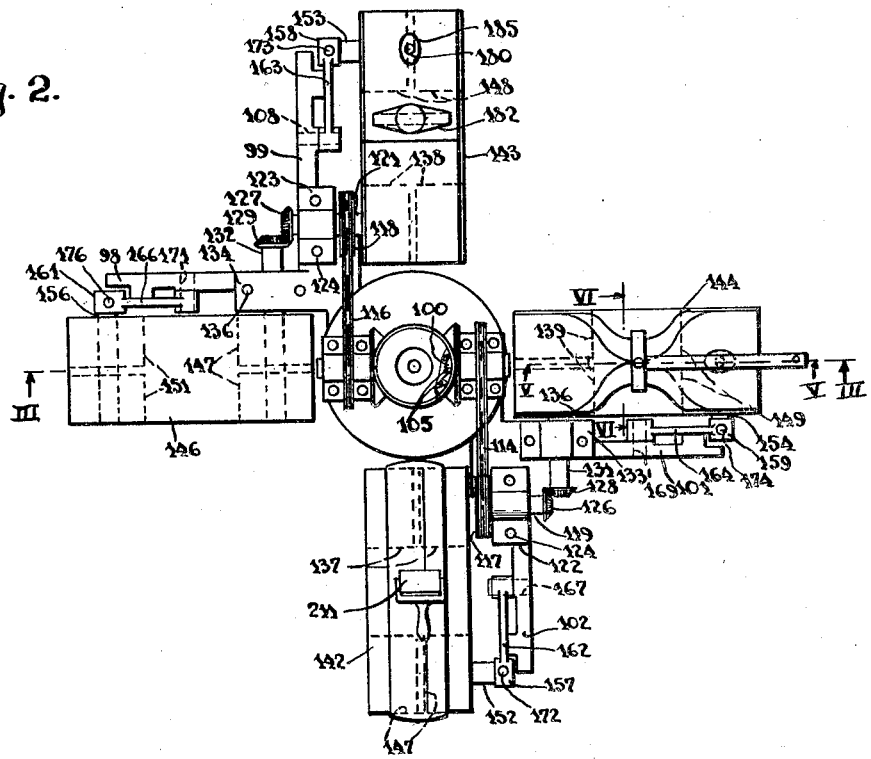
Fig. 2 is a plan view of a portion of the apparatus illustrated by Fig. 1 embodying a rotatable frame supporting a plurality of endless flexible forms.
Figure 3:
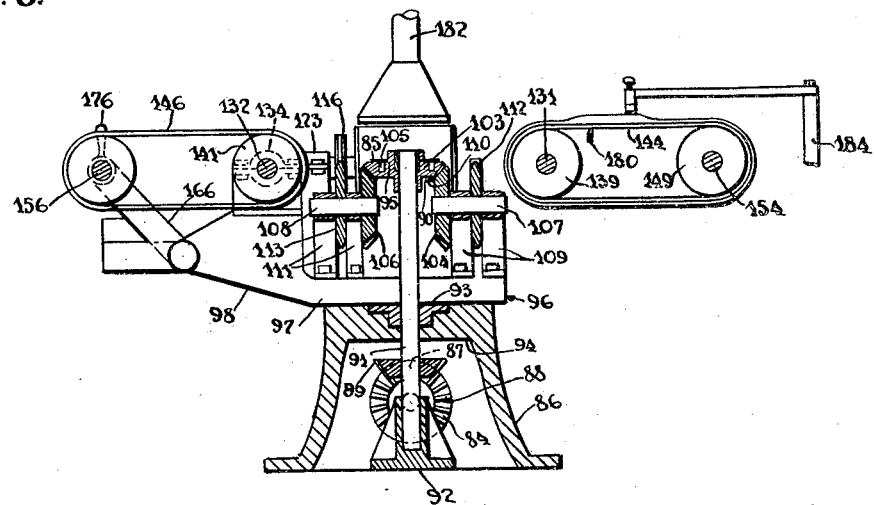
Fig. 3 is a cross-sectional view taken on line III—III of Fig. 2.

Another roller 202, which is substantially shorter than the roller 201, likewise is rotatably secured upon a pin 203 having a threaded end portion secured within an opening formed adjacent the lower end of the block 194. The roller 202, like the roller 201, also projects inwardly from the block 194 toward the median plane of the form. A folding finger 204, rigidly secured to the inner end of the pin 203 beyond the roller 202, is inclined downwardly therefrom and terminates at a point immediately below the inner end of the roller 201. When the form 146 arrives at a position directly beneath the folding device 183, the opposite edges of the strip supported by the form manually are folded inwardly, as indicated by Fig. 2, until the outer folded edges thereof are located in a region between the rollers 197 and 198. The aforesaid rollers then are projected downwardly by the manual operation of the knob 189 until they engage the upper surface of the form 146. Thereafter, during the next intermittent operation of the forms 142, 143, 144 and 146 and the conveyor 27 when another portion of the strip of the material 21 is wound spirally upon the form 144, the opposite edges of the strip upon the form 146 are folded and spliced upon each other to form a circumferential seam by the automatic operation of the folding device 183.

After this and all of the aforesaid accompanying operations are completed, the frame 96 is again rotated until the form 143 is positioned adjacent the discharge end of the conveyor 27 and while another portion of the strip 21 is being wound spirally thereon, a stitching roller 211 is employed for uniting the edges of the strip forming the aforesaid circumferential seam. As only a short period of time is required for this operation, the handle 176 controlling the position of the arm 166 is moved manually, as illustrated by Fig. 4, while all of the forms are still rotating thus collapsing the form 146 by moving a portion thereof in the direction of a diametrically opposite portion, and providing a loop therein which permits a completely formed inner tube 206 to be removed therefrom. By repeating this series of operations, an inner tube 206 may be removed from each of the forms 142, 144, 143 and 146 successively for any continuous period during which the operation of the apparatus is required. The inner tubes 206 are inflated and cured in individual molds of any well-known character, not shown.

It is to be understood not to be necessary to employ a calender capable of providing a double ply strip of material but any standard type calender may be substituted in the apparatus. Any desired number of layers of laminations may be obtained in a tube by multiplying the number of revolutions of the forms 142, 143, 144 and 146 before the intermittent periods of operation of the apparatus terminate. This result may be accomplished in any suitable manner, as for example, by varying the driven ratio between the segment 69 and the pinion 71. The apparatus also may be employed without a calender by unwinding a strip of stock upon the conveyor 27 from adjacent supply reels. It is further to be understood that the endless flexible forms may be employed as individual units upon which to construct inner tubes for pneumatic tire casings or in multiple, as shown, with any other form of conveying apparatus for supplying a strip of plastic material to them, either successively or simultaneously. Likewise, any suitable form of apparatus may be employed for the purpose of applying anti-friction material to the plastic strips, or for folding their opposite edge portions in forming a tubular article. Incidentally, it is well known that such folding operation may be performed manually, if desired, and such method accordingly may be employed instead of the mechanical apparatus herein illustrated for that purpose.

It is to be noted that the conveyor 27 and the forms 142, 143, 144 and 146 are rotatably driven by the operations of the pin 63 during substantially less than 180° of its rotational movement, which permits the conveyor and forms to remain at rest for a period substantially longer than the period for which they are rotated. This is true, by reason of the fact that the mechanism is driven while the pin is traveling between the axis of the crank shaft 58 and the stud shaft 68, supporting the segment while the idle period occurs when the pin is operating through an arc disposed externally to the aforesaid crank shaft and stud shaft. The ratio between these operative and inoperative periods may be varied by varying the distance between the crank shaft 58 and the stud shaft 68.

From the foregoing description, it is apparent that this invention provides a very efficient and economical apparatus for the manufacture, upon a production scale, of laminated inner tubes for pneumatic tire casings from stock received directly from the calender. These tubes are completely formed or assembled when they are received from the apparatus and thus are adapted immediately to be placed in individual molds suitable for the vulcanization of such tubes.

Having described a preferred form of apparatus and method embodying this invention, its scope is defined as follows:

1. An apparatus for manufacturing tubular articles comprising an endless flexible form having an opening intermediate its edges, and spaced pairs of rollers for rotatably supporting opposite ends of the form, the opening in the form being disposed oppositely to the space between the pairs of rollers.

2. An apparatus for manufacturing tubular articles comprising a flexible endless form having an opening intermediate its edges, spaced pairs of rollers for rotatably supporting opposite ends of the form, and means for moving the rollers to provide a loop in the form.

3. A machine for constructing inner tubes for pneumatic tires comprising a pedestal, a driven shaft disposed vertically within the pedestal and having a horizontal frame rotatably disposed upon the upper extremity thereof, a plurality of pairs of parallel rollers secured to the frame, means interconnecting the rollers and the shaft for simultaneously rotating the former, and means for moving one of each of the pairs of rollers toward the other pair.

4. An apparatus for manufacturing a tubular article comprising in combination, a flexible endless form, means for supplying a strip of rubber compound to the form whereby the strip will adopt substantially the contour of the form, means for folding the edges of the strip longitudinally of the form to provide a tubular article and to provide longitudinal seams on the article, and means for collapsing the form to remove the article therefrom.

5. An apparatus for manufacturing a tubular article comprising in combination, a flexible endless form, a plurality of pairs of spaced rollers on which said form is mounted, means for supplying a strip of rubber compound to the form whereby the strip will adopt substantially the contour of the form, means for folding the edges of the strip longitudinally of the form to provide a tubular article and to provide longitudinal seams on the article, and means for moving one pair of said rollers toward another pair to collapse the form whereby the article may be removed therefrom.

6. An apparatus for manufacturing an inner tube for a pneumatic tire comprising in combination, a flexible endless form having an opening intermediate its edges, a plurality of pairs of spaced rollers on which said form is mounted, the opening in said form being disposed opposite to the space between at least one pair of said rollers, means for supplying a strip of rubber compound to the form whereby the strip will adopt substantially the contour of the form, said opening and the space between said last mentioned pair of rollers providing a cavity to receive a valve stem disposed on the strip, means for folding the edges of the strip longitudinally of the form to provide a tube and to provide longitudinal seams on the tube, and means for collapsing the form to remove the tube therefrom.

In witness whereof, I have hereunto signed my name.

Signed at Akron, in the county of Summit and State of Ohio, U. S. A., this 26th day of December, 1928.

WILL C. STATE.